US00RE36511E

United States Patent [19]

Liou et al.

[11] E Patent Number: Re. 36,511

[45] Reissued Date of Patent: Jan. 18, 2000

[54] EJECTOR FOR A TRAY DEVICE

[75] Inventors: Dong-Yih Liou; Wen-Chi Tseng; Chung-Chi Liao, all of Taoyuan, Taiwan

[73] Assignee: Acer Peripherals Inc., Taiwan

[21] Appl. No.: 09/164,834

[22] Filed: Oct. 1, 1998

Related U.S. Patent Documents

Reissue of:

[64] Patent No.: 5,561,653
Issued: Oct. 1, 1996
Appl. No.: 08/337,941
Filed: Nov. 10, 1994

[51] Int. Cl.[7] ..... G11B 33/02; G11B 17/04

[52] U.S. Cl. ..... 369/77.1; 360/99.06

[58] Field of Search ..... 369/77.1, 77.2, 369/75.1; 360/99.02, 99.06

[56] References Cited

U.S. PATENT DOCUMENTS

| | | | |
|---|---|---|---|
| 3,660,637 | 5/1972 | Grove | 219/413 |
| 4,419,703 | 12/1983 | Gruczelak et al. | 360/99.06 |
| 5,310,086 | 5/1994 | Julinot | 222/1 |
| 5,329,516 | 7/1994 | Hoshi et al. | 369/77.1 |
| 5,386,403 | 1/1995 | Morioka et al. | 369/37 |
| 5,386,407 | 1/1995 | Park | 369/77.2 |
| 5,391,082 | 2/1995 | Airhart | 439/68 |

*Primary Examiner*—Brian E Miller
*Attorney, Agent, or Firm*—Fulbright & Jaworski L.L.P.

[57] ABSTRACT

An ejector apparatus of a tray device is provided. The tray device movably seats within the space of an electronic equipment. The ejector apparatus includes a support and an ejector. The support has a attachment apparatus adapted to mount on a chassis of the electronic equipment. The ejector pushes the tray device out of the electronic equipment in response to a force applied from the outside of the electronic equipment. The ejector is pivotally connected to the support.

8 Claims, 2 Drawing Sheets

EJECTOR FOR A TRAY DEVICE

Matter enclosed in heavy brackets [ ] appears in the original patent but forms no part of this reissue specification; matter printed in italics indicates the additions made by reissue.

TECHNICAL FIELD OF THE INVENTION

This invention relates to the ejection mechanism for the tray device of an electronic equipment, e.g. laser disk, compact disk or CD ROM player.

BACKGROUND OF THE INVENTION

The electronic equipment, such as laser disk, compact disk or CD ROM, in general, has an input device of a tray form for accommodating the disk in which a huge amount of information is stored. The tray device movably seats within the space of an electronic equipment. Typically, an electrically driven step motor is usually employed to operate the close/open mechanism of the disk tray device.

However, when the electronic equipment is in state of malfunction or being incapable of receiving the operation power, the user accordingly may not operate the equipment in order to retrieve the disk within the disk tray inside the equipment.

To solve the problems mentioned in aforesaid situation, one conventional approach in the art has been known to design a cavity on front panel of the disk tray device which is accessible by the finger of the user or a tool. The user then may use his finger or the tool to apply the force required to pull the disk tray out of the electronic equipment. However, this approach would definitely affect the exterior appearance of the equipment substantially not to mention other drawbacks, e.g. the possibility of accumulation of the dust onto the cavity.

SUMMARY OF THE INVENTION

To the shortcomings of aforesaid conventional art, the invention provides an ejector apparatus within the electronic equipment which allows the user to retrieve the disk by easily ejecting the disk tray out of the inner space of the electronic equipment.

The ejector apparatus includes a support and an ejector. The support has a connector apparatus adapted to connect with a chassis of the electronic equipment. The ejector pushes the tray device out of the electronic equipment in response to a force applied from the outside of the electronic equipment. The ejector is pivotally connected to the support.

DETAILED DESCRIPTION OF A PREFERRED EMBODIMENT

Figure 1:
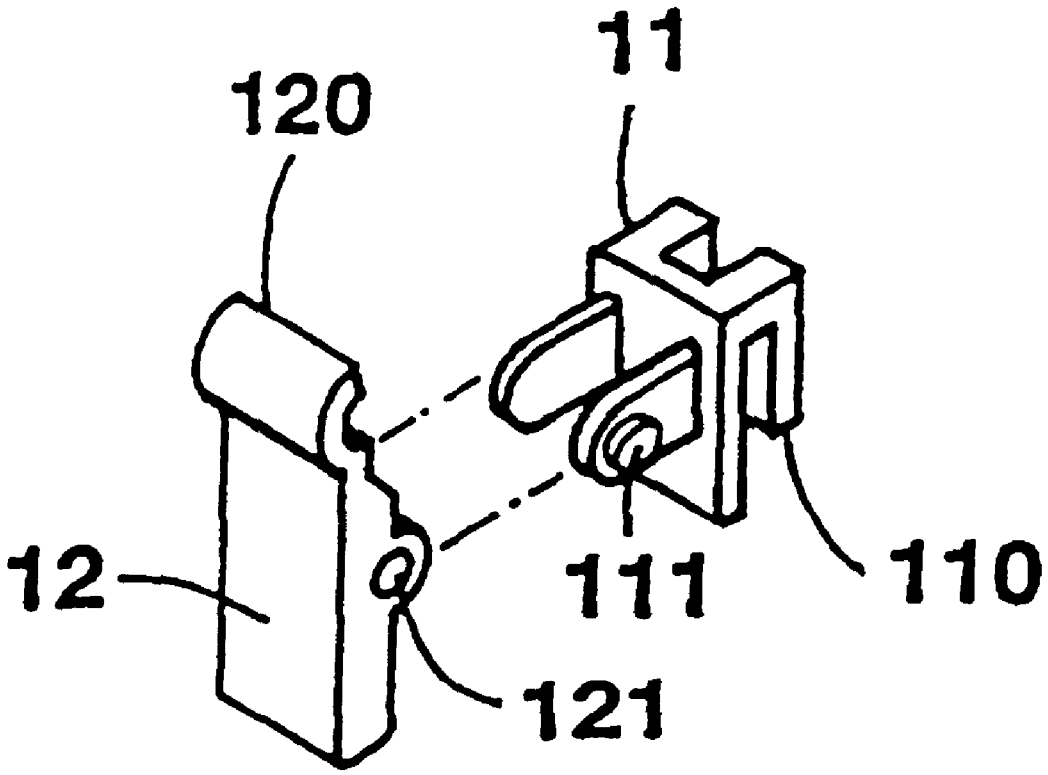
FIG. 1 discloses an explosive view of the components of the ejector apparatus in accordance with the one preferred embodiment of the invention.
Figure 2:
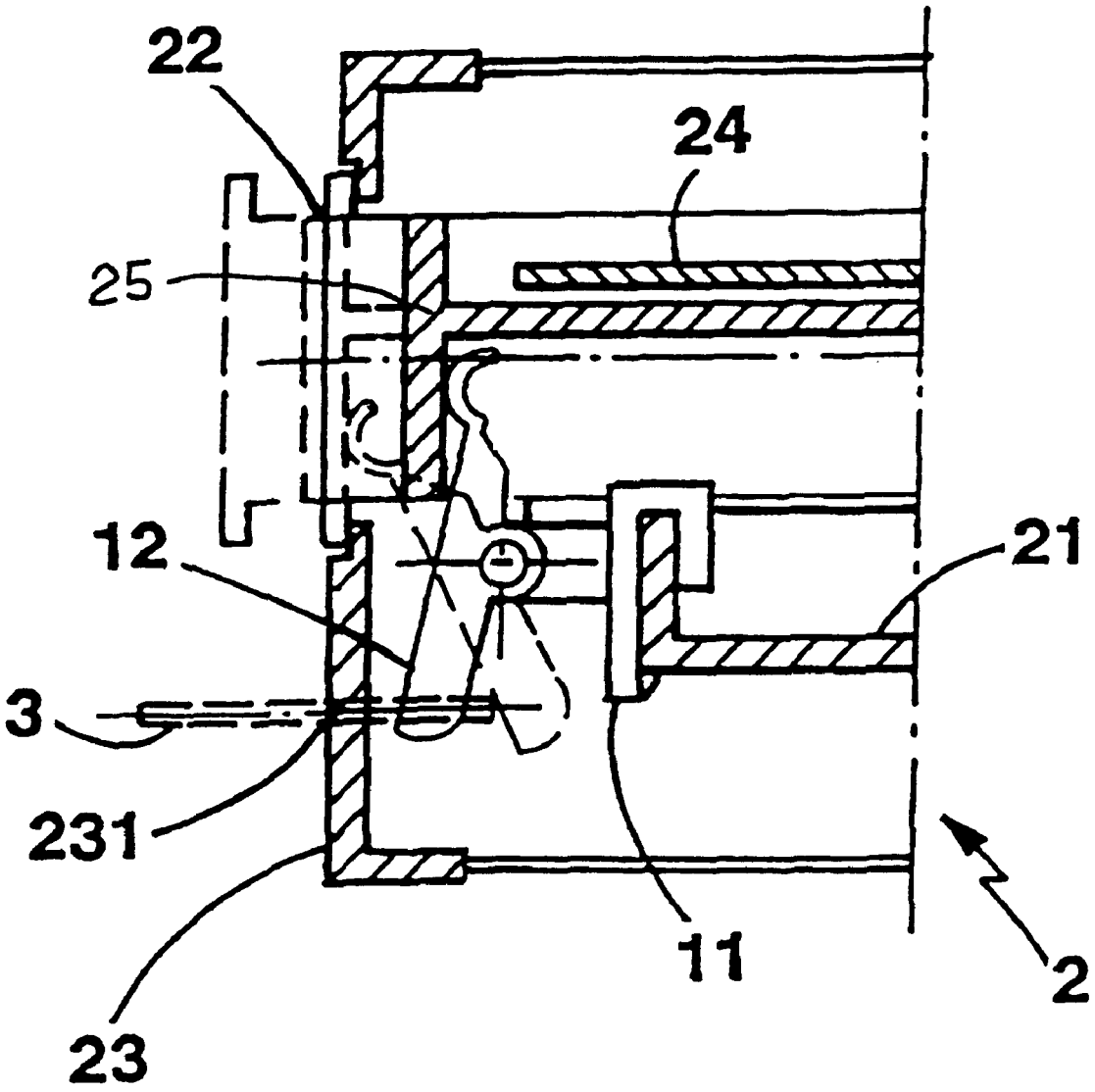
FIG. 2 is a sectional view showing how the invention cooperating with other components of the electronic equipment.

With reference to the FIG. 1 and FIG. 2, the invention includes a support 11 and an ejector 12. The support 11 has a attachment apparatus 110 adapted to mount on a chassis 21 of the electronic equipment 2. With the shown embodiment, the attachment apparatus 110 is form of a slot with which the edge of the chassis 21 engages. The ejector 12 is a generally plate-like arm element and is pivotally connected to the support at the hinge pin 111 through the hole 121. The upper end of the ejector 12 is provided with a curve-shape pusher 120 to have a better contact relationship with the inner vertical surface of the disk tray 22 in accordance with one preferred embodiment of the ejector 12.

The electronic equipment 2 has a front panel 23 which has a hole 231 for the passage of a thin pin 3. Before operating the invention, the user may reshape a metal paperclip to form a thin pin 3. When the thin pin 3 is forced into the hole 231 and applies a force on the lower surface of the ejector 12, the pusher 120 of the ejector 12 accordingly pushes the tray device 22 out of the electronic equipment 2 in response to the force applied from the outside as a result of the leverage effect created at the hinge pin 111. Also shown in the FIG. 2 is the disk 24 within the disk tray 22.

The above details of the preferred embodiment of the invention aforesaid is illustrative rather than limiting. For instance, the preferred embodiment of the curve-shape pusher 120 may be replaced equivalently by other forms which are obvious to persons skillful in the arts. Accordingly, any equivalent modifications, substitutes, alterations or changes to the preferred embodiment without departing from the spirit of the invention are likely to the persons ordinary skill in the art, and are still within the intended scope of the protection of the invention which is defined by the following claims and their equivalences.

What is claimed is:

1. An ejector apparatus for a tray device movably seated within an electronic equipment, the electronic equipment having a chassis and a front panel *with a hole*, the tray device having a front panel door [with a hole], the ejector apparatus comprising:

a support having a hinge pin and a slot fixedly engaged to an edge of the chassis;

a generally plate-like arm element pivotally connected to the hinge pin of the support, the arm element having a first end and a second end, the first end acting as a pusher wherein in response to a force applied in a first direction on the second end of the plate-like arm element, the pusher of the plate-like arm element contacts the front panel door of the tray device to push, in a second direction, opposite to the first direction, the tray device out of the electronic equipment, the force applied to the second end of the arm element being applied by a user via a pin which passes through the hole.

2. The ejector apparatus as in claim 1, wherein the pin is formed from a paperclip.

3. The ejector apparatus as in claim 1, wherein the electronic equipment is a compact disk player.

4. The ejector apparatus as in claim 1, wherein the electronic equipment is a CD ROM player.

5. The ejector apparatus as in claim 1, wherein the electronic equipment is a laser disk player.

[6. The ejector apparatus as in claim 1, wherein the front panel has a hole for the passage of the pin.]

7. The ejector apparatus of claim 1 wherein the upper end of the plate-like arm element is curve-shaped.

8. An [eject] *ejector* apparatus for use within electronic equipment including[,] a chassis*, a front panel with a hole,* and a cabinet enclosure with an opening, the ejector apparatus comprising:

a tray device adapted to support a removable data storage element and having a first position extending out of the opening to receive the removable data storage element and a second position disposed within the enclosure, the tray device having a front panel door [with a hole], said front panel door substantially flush with the opening of the cabinet enclosure when the tray device is in the second position;

a support having a hinge pin, the support disposed within the cabinet, positioned proximally to the tray device and fixedly engaged to the edge of the chassis; and an arm member, pivotally connected to the hinge pin of the support and having a second end which in response to a force applied in a first direction thereto causes a first end of the arm member to move in a second direction, opposite to said first direction, to contact an inner surface of the front panel door of the tray device and move the tray device from the second position to the first position, the force applied to the second end of the arm member being applied by a user via a pin which passes through the hole of the front panel [door].

9. The apparatus of claim 8 wherein the first end of the arm are member is curve-shaped.

* * * * *